(12) United States Patent
Wu et al.

(10) Patent No.: US 11,608,962 B2
(45) Date of Patent: Mar. 21, 2023

(54) MULTIPLE REFLECTION PANEL LAMP

(71) Applicant: FUJIAN SANAN SINO-SCIENCE PHOTOBIOTECH CO., LTD., Quanzhou (CN)

(72) Inventors: Chanjuan Wu, Quanzhou (CN); Yingying Chen, Quanzhou (CN); Nana Li, Quanzhou (CN); Shaoqing Lin, Quanzhou (CN); Wenfa Wang, Quanzhou (CN); Liang Zeng, Quanzhou (CN)

( * ) Notice: Subject to any disclaimer, the term of this patent is extended or adjusted under 35 U.S.C. 154(b) by 0 days.

(21) Appl. No.: 17/417,133

(22) PCT Filed: Nov. 1, 2019

(86) PCT No.: PCT/CN2019/115102
§ 371 (c)(1),
(2) Date: Jun. 22, 2021

(87) PCT Pub. No.: WO2021/008000
PCT Pub. Date: Jan. 21, 2021

(65) Prior Publication Data
US 2022/0128220 A1   Apr. 28, 2022

(30) Foreign Application Priority Data

Jul. 18, 2019   (CN) .......................... 201910650227.3

(51) Int. Cl.
*F21V 7/00* (2006.01)
*A01G 9/24* (2006.01)
(Continued)

(52) U.S. Cl.
CPC ............ *F21V 7/0033* (2013.01); *A01G 9/249* (2019.05); *F21V 21/02* (2013.01); *F21V 23/003* (2013.01); *F21Y 2115/10* (2016.08)

(58) Field of Classification Search
CPC ...... F21V 7/0033; F21V 21/02; F21V 23/003; F21V 7/00; F21V 7/164; F21V 19/001;
(Continued)

(56) References Cited

U.S. PATENT DOCUMENTS 8,376,583 B2 *   2/2013   Wang ...................... F21V 19/06
                                                            362/249.05
8,529,092 B2 *   9/2013   Lin ......................... F21S 2/005
                                                            362/249.06
(Continued)

FOREIGN PATENT DOCUMENTS

CN         201715354 U      1/2011
CN         203615146 U      5/2014
(Continued)

OTHER PUBLICATIONS

CN 203615146, Li, English Translation, May 28, 2014 (Year: 2014).*
CN 207334446, Hu et al, English Translation, May 8, 2018 (Year: 2018).*

*Primary Examiner* — Peggy A Neils
(74) *Attorney, Agent, or Firm* — Rumit Ranjit Kanakia

(57) ABSTRACT

The present invention relates to the technical field of lighting for plant, and in particular, provides a multi-reflection panel lamp. The multi-reflection panel lamp includes a fixing frame, a plurality of panel lamps, and a plurality of reflectors. The plurality of panel lamps are embedded in the fixing frame parallel to each other. The reflectors and the panel lamps are parallelly disposed on the fixing frame. Compared to other panel lamps, in the present invention, reflectors are disposed between panel lamps to reflect, a plurality of times by using a multi-refraction mechanism of the reflectors of the panel lamps, rays of light emitted by the panel lamps, so that plants are irradiated with the rays of light at various (Continued)

angles, thereby improving lighting intensity and uniformity and ensuring normal growth of the plants.

8 Claims, 15 Drawing Sheets

(51) Int. Cl.
*F21V 21/02* (2006.01)
*F21V 23/00* (2015.01)
*F21Y 115/10* (2016.01)

(58) Field of Classification Search
CPC ....... F21V 21/10; F21V 17/164; A01G 9/249; A01G 7/04; A01G 7/045; F21S 8/00; F21Y 2115/10
See application file for complete search history.

(56) References Cited

U.S. PATENT DOCUMENTS

| | | | |
|---|---|---|---|
| 9,447,949 B2* | 9/2016 | Rashidi Doust | F21V 17/02 |
| 10,999,980 B2* | 5/2021 | Goettle | F21V 23/045 |
| 2013/0141904 A1* | 6/2013 | Verfuerth | F21V 23/009 |
| | | | 29/874 |
| 2017/0248289 A1 | 8/2017 | Vasylyev | |

FOREIGN PATENT DOCUMENTS

| | | |
|---|---|---|
| CN | 207334446 U | 5/2018 |
| CN | 207471326 U | 6/2018 |
| CN | 110319389 A | 10/2019 |

\* cited by examiner

MULTIPLE REFLECTION PANEL LAMP

BACKGROUND

Technical Field

The present invention relates to the technical field of plant lighting, and in particular, to a multi-reflection panel lamp.

Related Art

A luminous environment is one of the important physical environmental factors that are indispensable for growth and development of plants. The growth of most plants on the earth depends on light sources from the sun, but the plants on the earth do not get sunlight in 24 hours. Different geographical locations and the climatic environments cause a great difference in sunlight obtained by the plants, which leads to low efficiency of growth and development of the plants. Plant lamps are widely used in the luminous environment required for plant growth and development. The plant lamp has an illuminant as a light source, which is an artificial light source that meets lighting conditions required for plant photosynthesis. The light source of the plant lamp has the advantage of abundant wavelength types, and light energy from radiation of the lamp conforms to a spectral range required for plant photosynthesis. In the absence of sunlight, the plant lamp can be used as sunlight to concentrate light with specific wavelengths to irradiate crops in a balanced manner, which not only can adjust flowering and fruiting of the crops, but also can control plant heights and plant nutrients, so that the plants can grow normally or better.

When a panel type plant lamp is applied to multi-layer planting, with limited height of the planting space of multi-layer planting, the light intensity of the lamp can no longer be reduced by adjusting the height of the lamp when the lamp has been disposed on the top. At this time, the light density can be further reduced by increasing the horizontal distance between lamps, but at the same time, the light uniformity of a light receiving surface is reduced. In the middle of a planting region, due to the superimposed effect of a plurality of lamps, the light uniformity is significantly improved. However, the edge of the planting region has no superimposed effect, and the light intensity is insufficient, which can easily cause the abnormal growth of edge plants. Or, light sources are the waste due to a fixed lamp distribution solution above a working aisle.

SUMMARY

To this end, it is necessary to provide a multi-reflection panel lamp, so as to solve the problems in the above background through a multi-refraction mechanism and a turning structure on the panel lamp, so that light sources can be fully utilized through the multi-refraction technology, thereby reducing a waste of light sources.

In order to achieve the above objective, the present invention provides a multi-reflection panel lamp, including a fixing frame, a plurality of panel lamps, and a plurality of reflectors. The plurality of panel lamps are embedded in the fixing frame parallel to each other, and the reflectors and the panel lamps are parallelly disposed on the fixing frame. Compared to other panel lamps, a multi-refraction mechanism is used to reflect, a plurality of times, rays of light emitted by the panel lamps, so that plants are irradiated with the rays of light at various angles, thereby improving lighting intensity and uniformity and ensuring normal growth of the plants.

Further, limiting frames are provided at two ends of the panel lamps, the limiting frames are fixedly mounted to the fixing frame, and a plurality of mounting plates are disposed on the limiting frame at one of the two ends of the panel lamps. In this way, the panel lamp can be easily assembled and disassembled.

Further, a number of the mounting plates is the same as a number of the panel lamps, and a plurality of holes are formed on outer sides of the mounting plates. The holes on the mounting plate facilitate heat dissipation of the panel lamp, so as to prevent the panel lamp from overheating due to working for a long time.

Further, a number of the panel lamps is 2 or more, a number of the reflectors is 2 or more, and each of the reflectors is located between two adjacent panel lamps or adjacent to the panel lamps. Alternating arrangement can maximize the effect of the reflector.

Further, a light emitting diode (LED) driver is disposed on the fixing frame, and the LED driver is connected to the panel lamps and is parallel to the panel lamps, so as to make full use of the limited space.

Further, fixing plates are disposed on outer sides of the limiting frames, and limiting through holes are bored on upper surfaces of the fixing plates. The fixing plates can be used to fix the panel lamps and prevent positions of the panel lamps from being shifted.

Further, rotational assemblies are disposed on the fixing frame, the rotational assemblies include rotational through holes and fixing buttons, the rotational through holes are disposed at two symmetrical ends of a lamp holder, and the fixing buttons are embedded in the rotational through holes. Surfaces of the panel lamps may be adjusted to an angle facing the plant, so that edges of the plant can also be irradiated by the panel lamps, and the panel lamps can perform irradiation in a more flexible manner, thereby reducing a waste of light sources.

Further, the reflectors are rectangular, and reflective assemblies are disposed on both upper surfaces and lower surfaces of the reflectors, so that the utilization of the space can be maximized, thereby saving costs.

Further, both the rotational through hole and the fixing button are made of stainless steel or other high-density alloy materials, so that the panel lamps are firmly fixed, and service life of the panel lamp is prolonged.

Further, at least two multi-reflection panel lamps, where the at least two multi-reflection panel lamps are respectively disposed above and under a plant.

Further, the multi-reflection panel lamp disposed above the plant is 0.5 m, 0.3 m, or 0.15 m from a top of the plant.

In comparison to the prior art, the above technical solution has the following beneficial effects.

1. Compared to other panel lamps, in the present invention, reflectors are disposed between panel lamps to reflect, a plurality of times by using a multi-refraction mechanism of the reflectors of the panel lamps, rays of light emitted by the panel lamps, so that plants are irradiated with the rays of light at various angles, thereby improving lighting intensity and uniformity and ensuring normal growth of the plants.

2. In the present invention, the surface of the panel lamp is adjusted to an angle facing the plant by rotating the assembly, so that edges of the plant can also be irradiated by the panel lamps, and the panel lamp can perform irradiation in a more flexible manner, thereby reducing a waste of light sources.

DESCRIPTION OF REFERENCE SYMBOLS IN THE DRAWINGS

Figure 1:
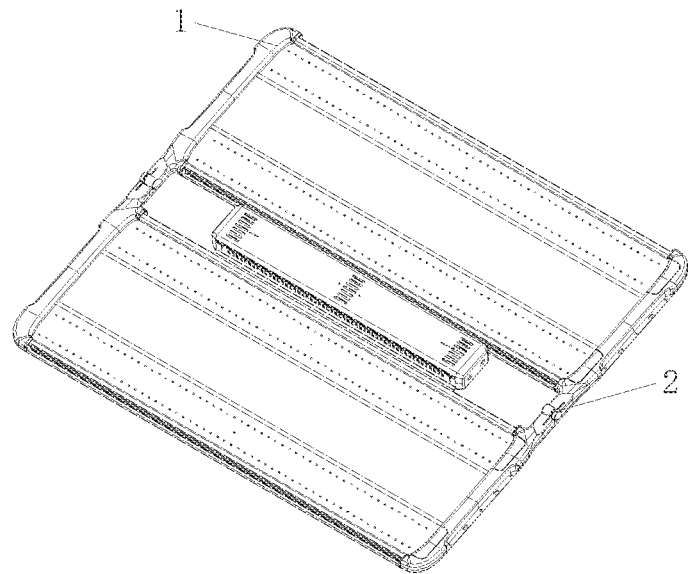
FIG. 1 is a schematic structural diagram of a multi-reflection panel lamp according to the present invention.
Figure 2:
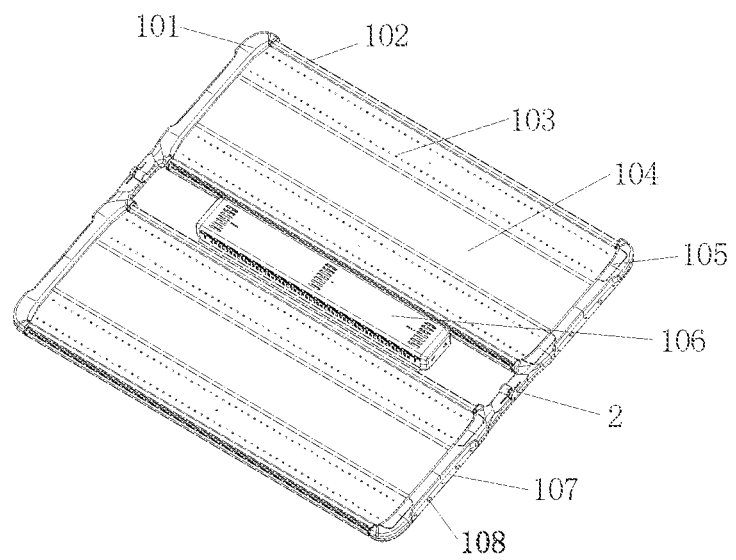
FIG. 2 is a schematic structural diagram of a lamp holder according to the embodiment.
Figure 3:
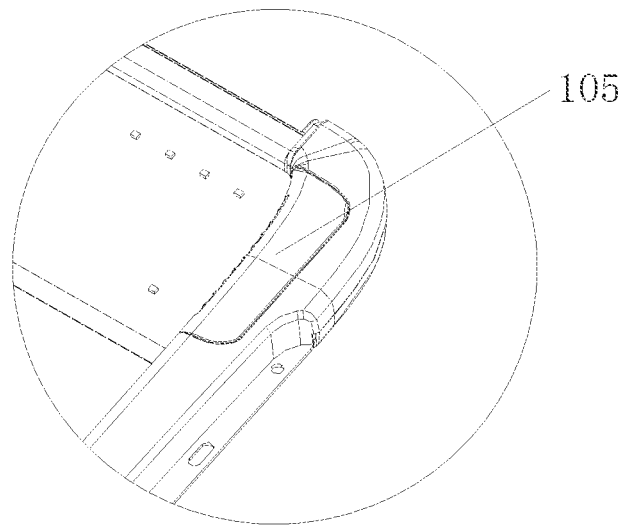
FIG. 3 is a schematic structural diagram of a mounting plate according to the embodiment.
Figure 4:
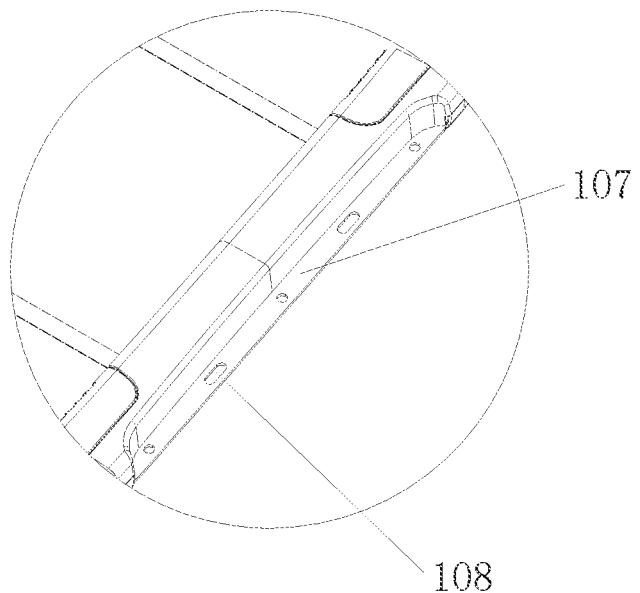
FIG. 4 is a schematic structural diagram of a fixing plate according to the embodiment.
Figure 5:
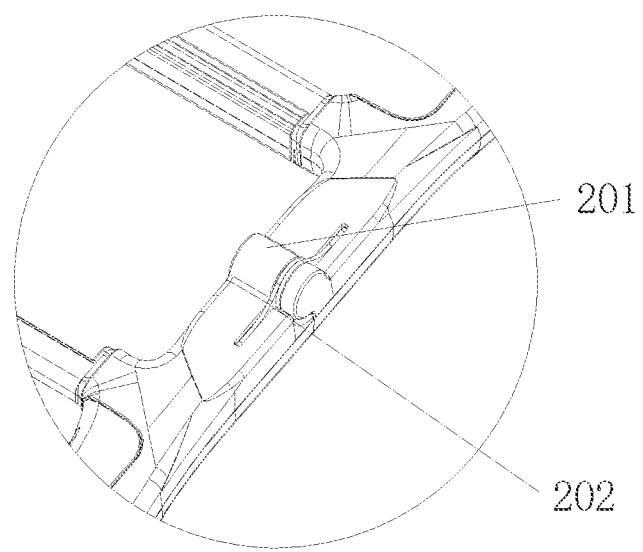
FIG. 5 is a schematic structural diagram of a rotational assembly according to the embodiment.
Figure 6:
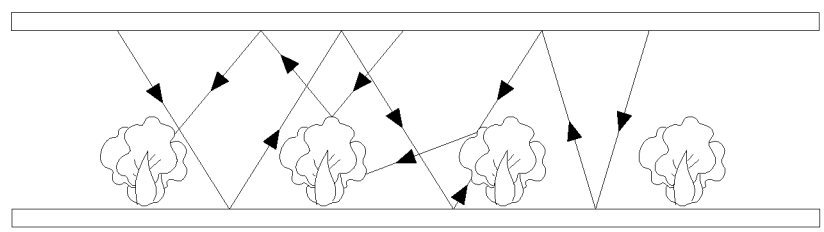
FIG. 6 is a schematic diagram of a usage effect of a multi-reflection panel lamp according to the present invention.

1. Lamp holder, 101, Limiting frame, 102, Fixing frame, 103, Panel lamp, 104, Reflector, 105, Mounting plate, 106, LED driver, 107, Fixing plate, 108, Limiting through hole, 2. Rotational assembly, 201, Rotational through hole, 202, Fixing button.

DETAILED DESCRIPTION

In order to describe the technical content, structural features, achieved objectives and effects of the technical solution in detail, detailed descriptions are given in combination with specific embodiments and accompanying drawings below.

Referring to FIG. 1 to FIG. 6, a multi-reflection panel lamp of this embodiment includes a fixing frame 102, four panel lamps 103, and two reflectors 104. The four panel lamps 103 are embedded in the fixing frame 102 parallel to each other. The reflectors 104 and the panel lamps 103 are parallelly disposed on the fixing frame 102. Each of the reflectors 104 is located between two adjacent panel lamps 103. The reflectors 104 are rectangular, and reflective assemblies are disposed on both upper surfaces and lower surfaces of the reflectors 104. Limiting frames 101 are provided at two ends of the panel lamps 103, the limiting frames 101 are fixedly mounted to the fixing frame 102, and a plurality of mounting plates 105 are disposed on the limiting frame 101 at one of the two ends of the panel lamps 103. A number of the mounting plates 105 and a number of the panel lamps 102 are both four. A plurality of holes are formed on one sides of the mounting plates 105 facing the panel lamp, and the plurality of holes are arranged on the same horizontal line. An LED driver 106 is disposed in the middle of the fixing frame 102. Both sides of the LED driver 106 are connected to one sides of the panel lamps 103 and are parallel to the panel lamps 103. Fixing plates 107 are disposed on outer sides of the limiting frames 101, and the fixing plates 107 are slightly lower than the limiting frames 101. Limiting through holes 108 are bored on an upper surface of the fixing plates 107, and a number of the limiting through holes 108 is two.

In this embodiment, rotational assemblies 2 are disposed on the fixing frame 102. The rotational assemblies 2 include rotational through holes 201 and fixing buttons 202. The rotational through holes 201 are disposed in the middle of two symmetrical ends of a lamp holder 1. Middle sections of the fixing buttons 202 are embedded in the middle of the rotational through holes 201.

During specific use, the limiting frames 101 and the fixing frame 102 are first assembled, the fixing frame 102 is mounted to the far left of inner sides of the limiting frames 101, and the two panel lamps 103 are combined with a reflector 104 to be mounted to the right side of the fixing frame 102. During the mounting, one sides of the panel lamps 103 are embedded in the inner sides of the limiting frames 101, and then the mounting plate 105 at the end of the limiting frame 101 is lifted, so that the other side of the panel lamp 103 is embedded in a groove formed during lifting of the mounting plate 105. Then the mounting plate 105 is pressed to fix the panel lamp 103 on the limiting frame 101, a fixing frame 102 is connected to the right side of the combination of the panel lamp 103 and the reflector 104, the middle of the right side of the fixing frame 102 is combined with the left side of the LED driver 106, and a set of combinations of the panel lamp 103 and the reflector 104 that are the same as that one the left side are assembled on the right side of the LED driver to form an independent lamp. The lamp is fixed through the limiting through hole 108 bored on the upper surface of the fixing plate 107, so that the plant can be irradiated with rays of light after the panel lamps 103 on the luminaire are turned on. A plurality of luminaires are fixed in positions through the rotational through holes 201 provided for the lamp holder 1, and the rotational through holes 201 are used to adjust an irradiation angle of the panel lamp 103 and a refraction angle of the reflector 104, so that the plants can be uniformly irradiated with the rays of light. Upon adjustment of the angle, the angles of the panel lamp 103 and the reflector 104 are fixed by using the fixing buttons 202, to prevent the angles from being changed.

Through comparison of the illumination of the multi-reflection panel lamp at different heights from the top of the plant in the embodiments, statistics is collected about the illumination effects of the multi-reflection panel lamp at different heights compared to that of the non-reflection panel lamp, thereby further highlighting the beneficial effects of the embodiment.

Figure 7:
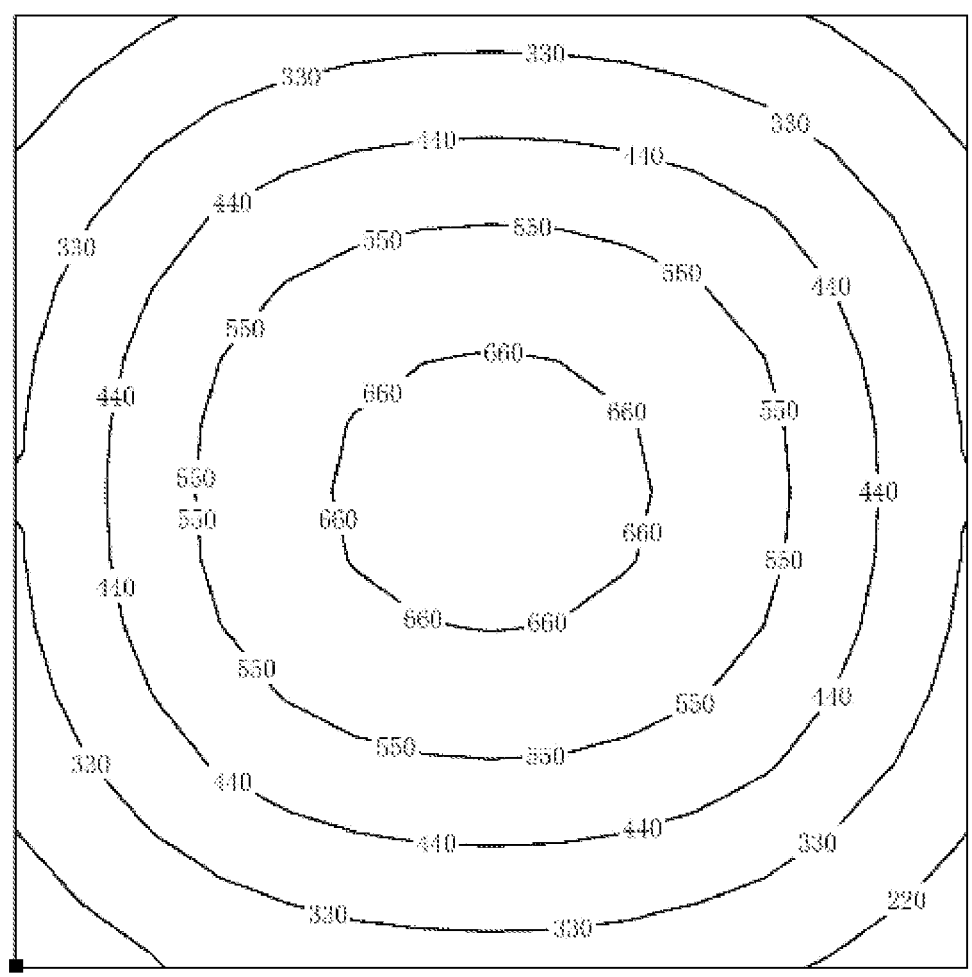
FIG. 7 is a schematic diagram of a spectrum of a multi-reflection panel lamp with a height of 0.5 m and 1.4*1.4 m according to the embodiment.
Figure 8:
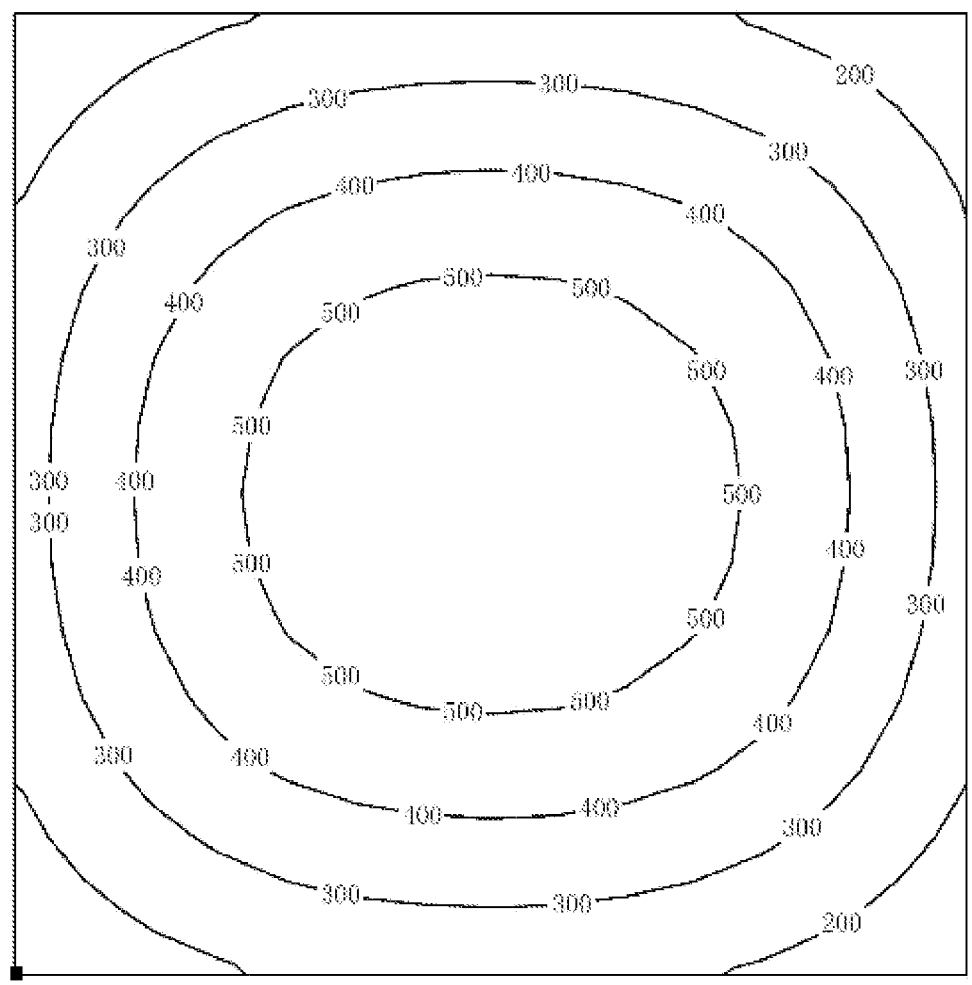
FIG. 8 is a schematic diagram of a spectrum of a non-reflection panel lamp with a height of 0.5 m and 1.4*1.4 m according to the embodiment.
Figure 9:
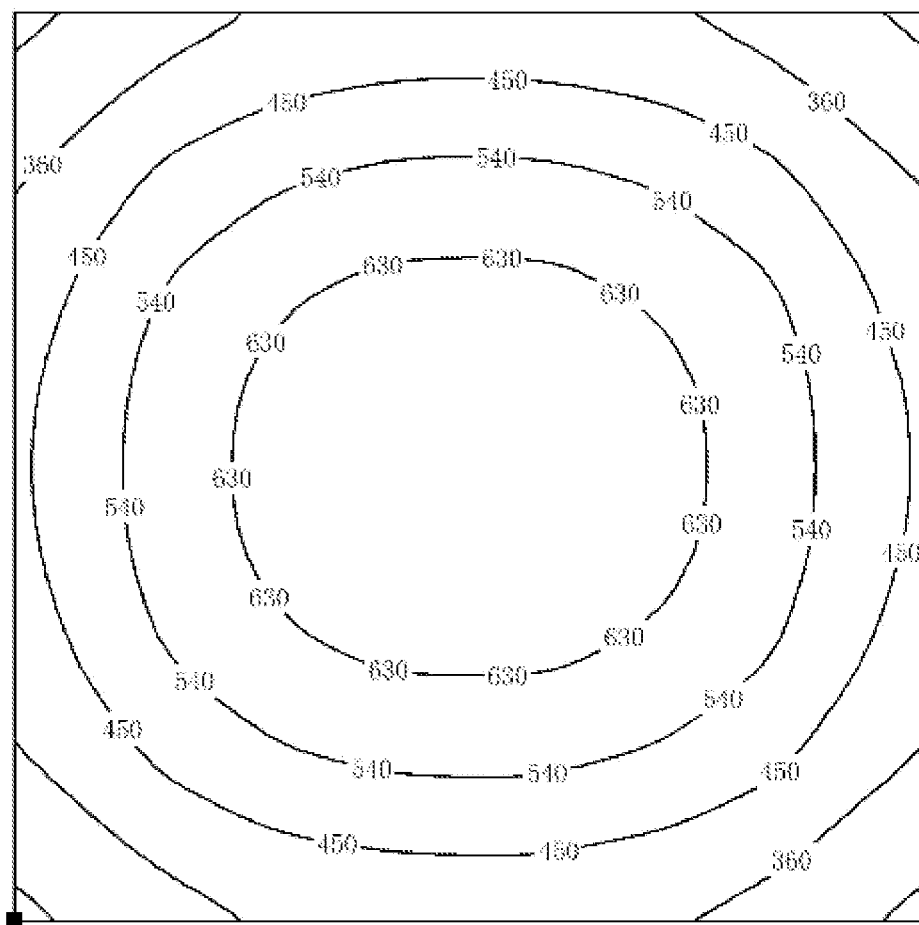
FIG. 9 is a schematic diagram of a spectrum of a multi-reflection panel lamp with a height of 0.5 m and 1.2*1.2 m according to the embodiment.
Figure 10:
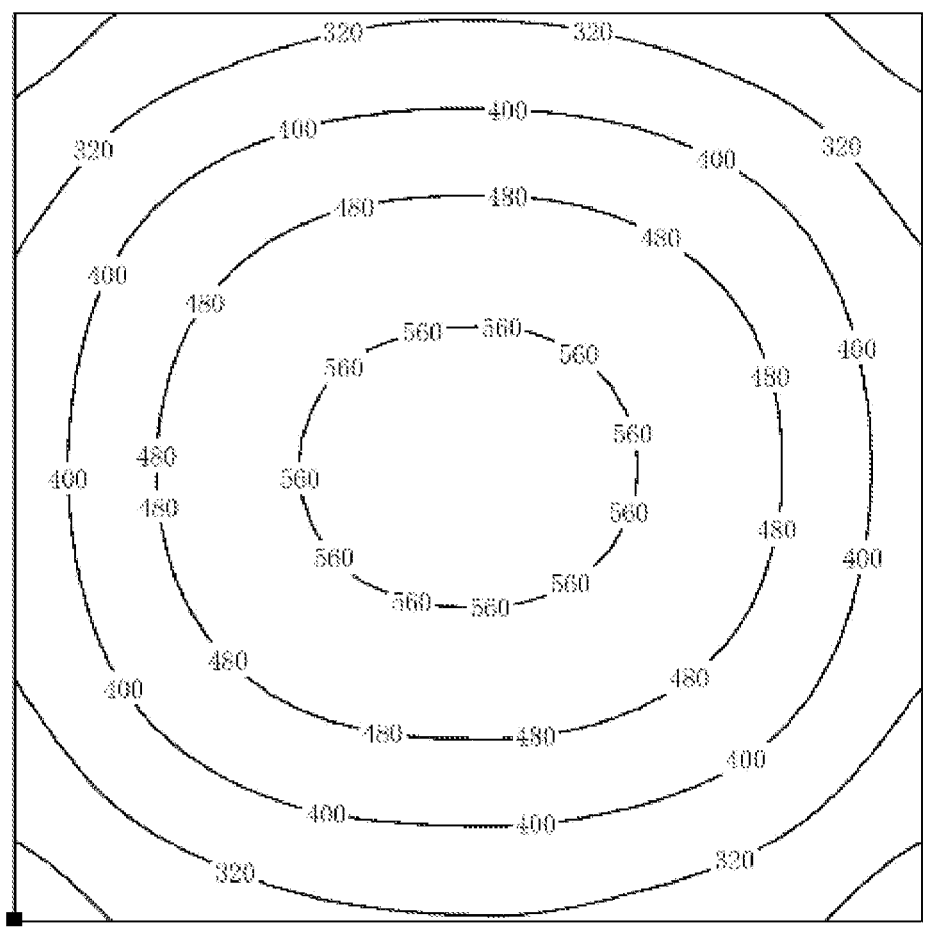
FIG. 10 is a schematic diagram of a spectrum of a non-reflection panel lamp with a height of 0.5 m and 1.2*1.2 m according to the embodiment.
Figure 11:
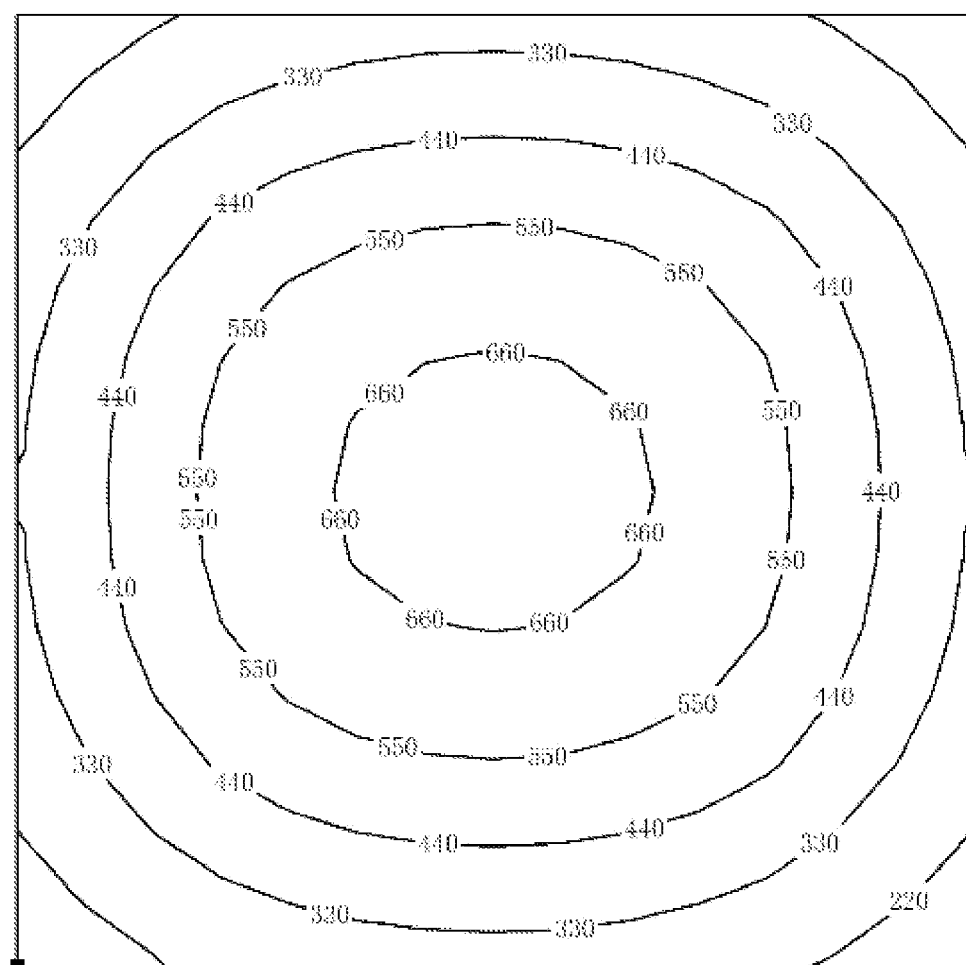
FIG. 11 is a schematic diagram of a spectrum of a multi-reflection panel lamp with a height of 0.3 m and 1.4*1.4 m according to the embodiment.
Figure 12:
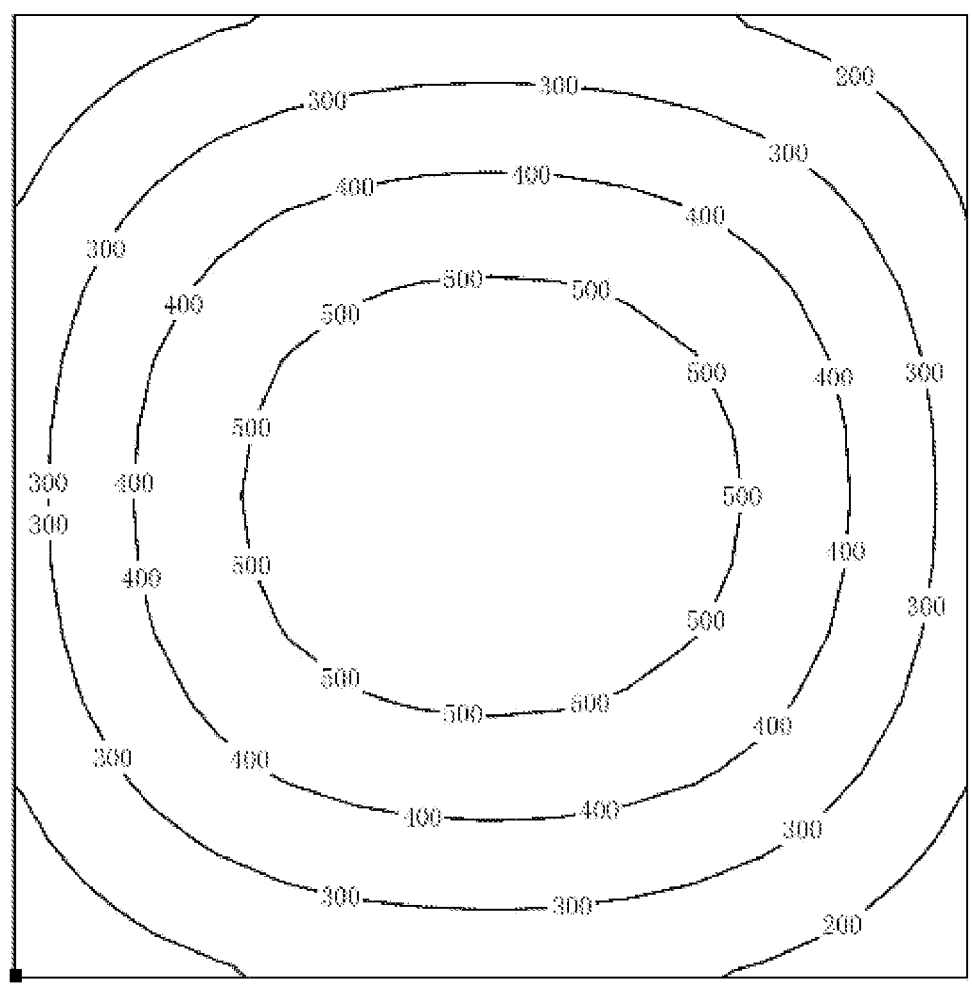
FIG. 12 is a schematic diagram of a spectrum of a non-reflection panel lamp with a height of 0.3 m and 1.4*1.4 m according to the embodiment.
Figure 13:
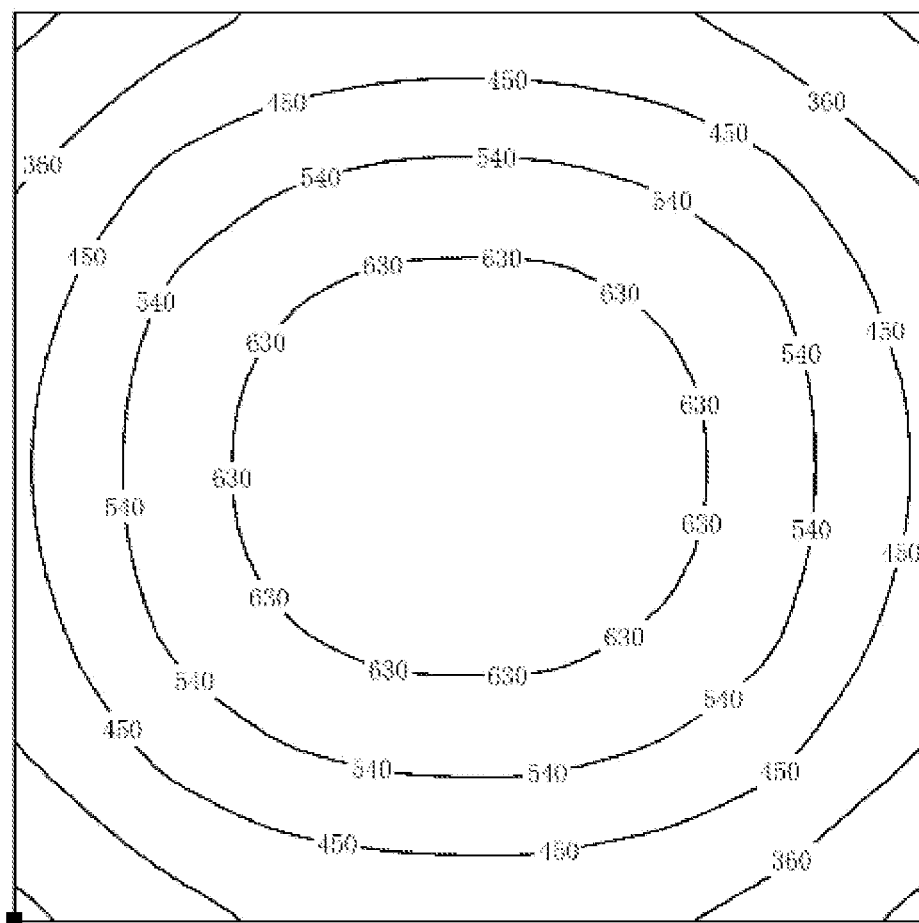
FIG. 13 is a schematic diagram of a spectrum of a multi-reflection panel lamp with a height of 0.3 m and 1.2*1.2 m according to the embodiment.
Figure 14:
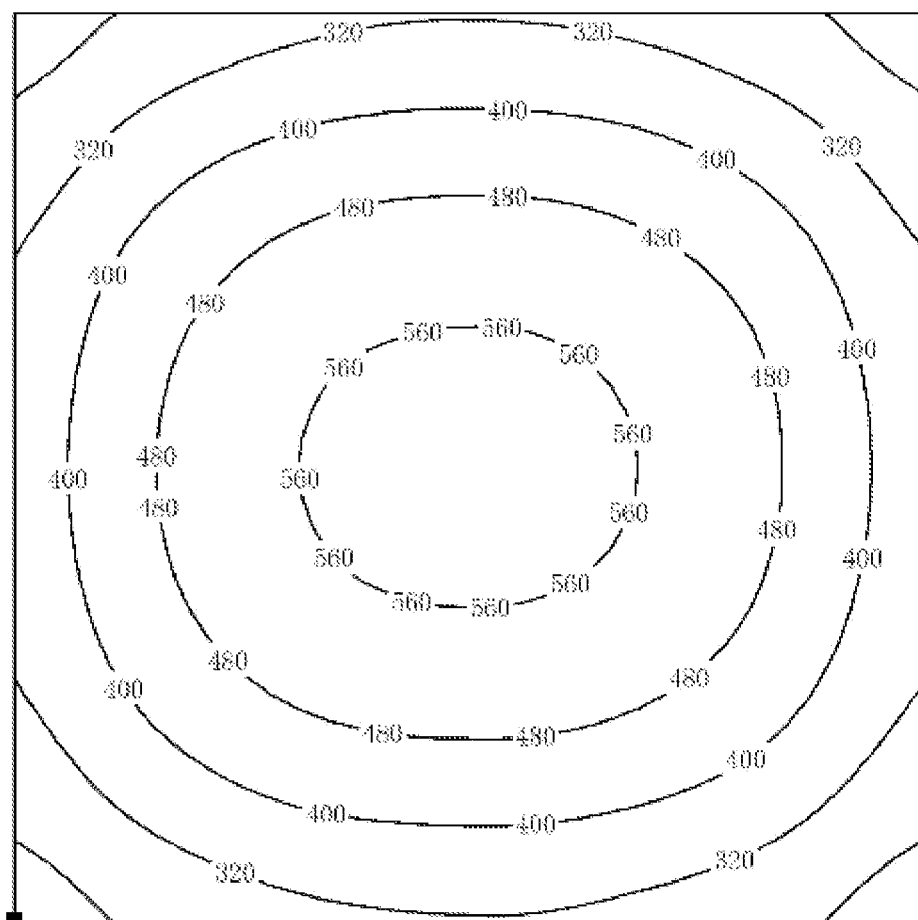
FIG. 14 is a schematic diagram of a spectrum of a non-reflection panel lamp with a height of 0.3 m and 1.2*1.2 m according to the embodiment.
Figure 15:
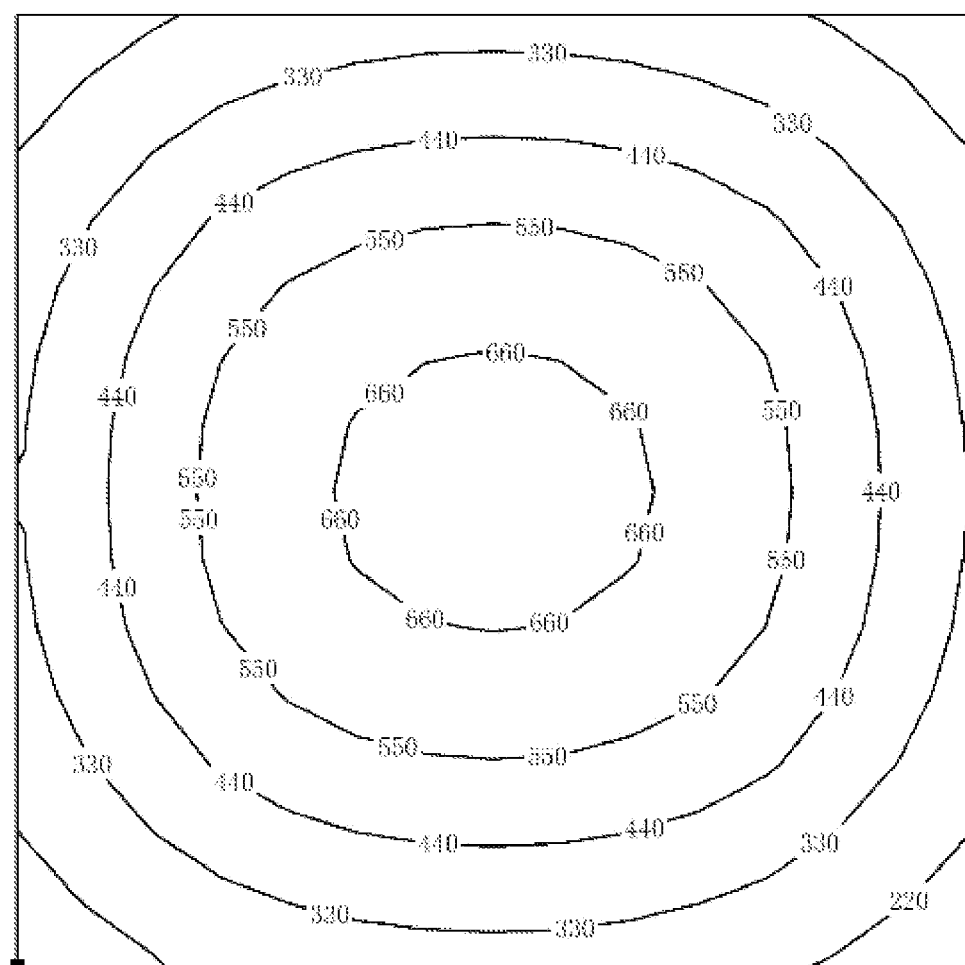
FIG. 15 is a schematic diagram of a spectrum of a multi-reflection panel lamp with a height of 0.15 m and 1.4*1.4 m according to the embodiment.
Figure 16:
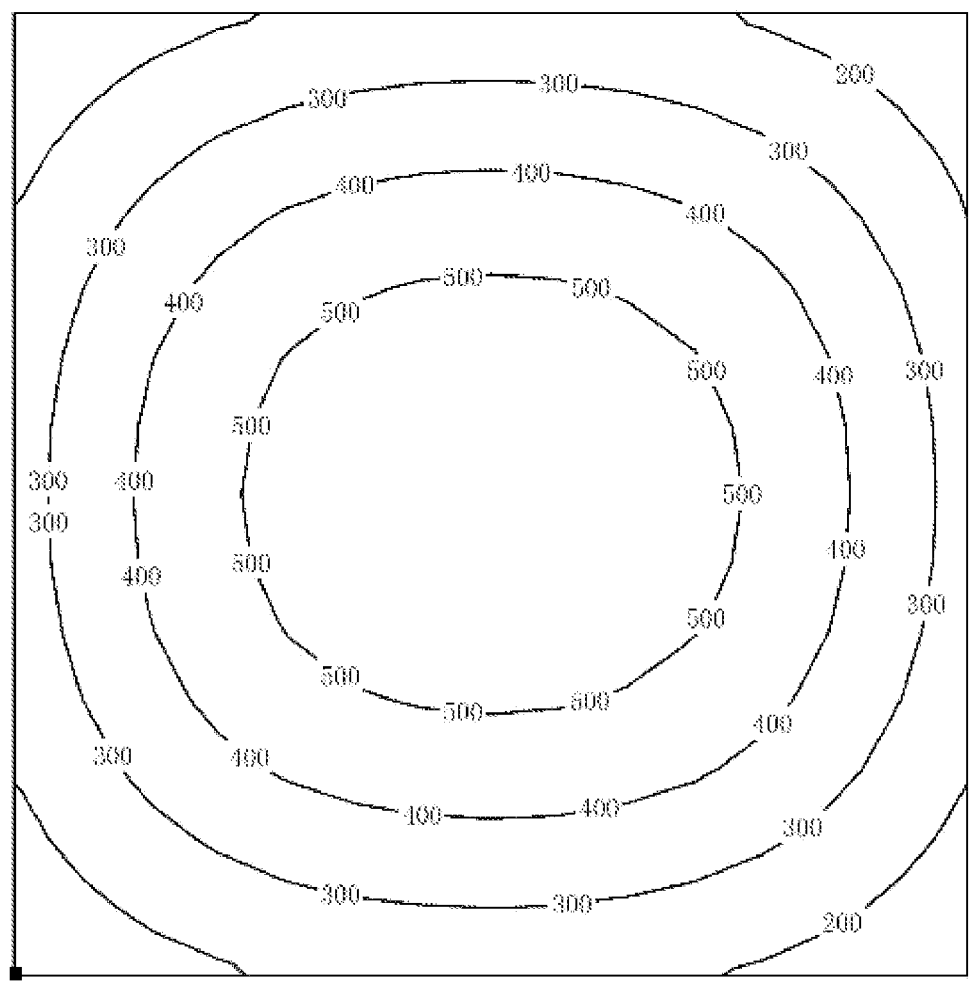
FIG. 16 is a schematic diagram of a spectrum of a non-reflection panel lamp with a height of 0.15 m and 1.4*1.4 m according to the embodiment.
Figure 17:
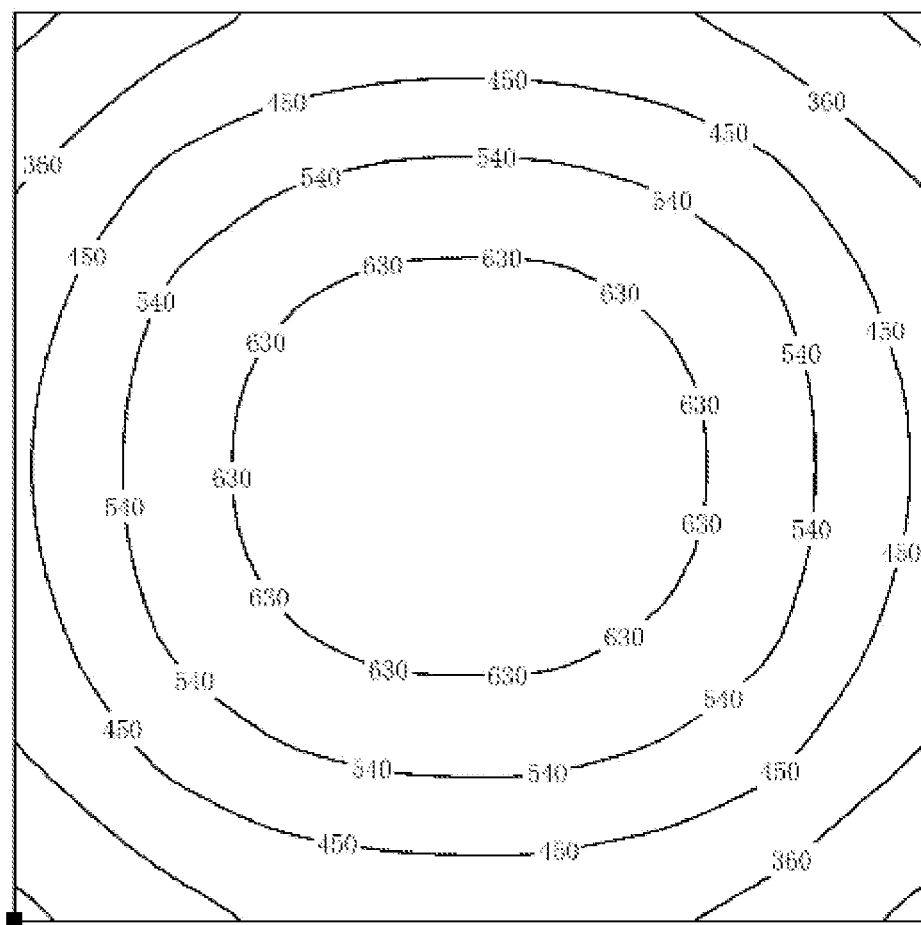
FIG. 17 is a schematic diagram of a spectrum of a multi-reflection panel lamp with a height of 0.15 m and 1.2*1.2 m according to the embodiment.
Figure 18:
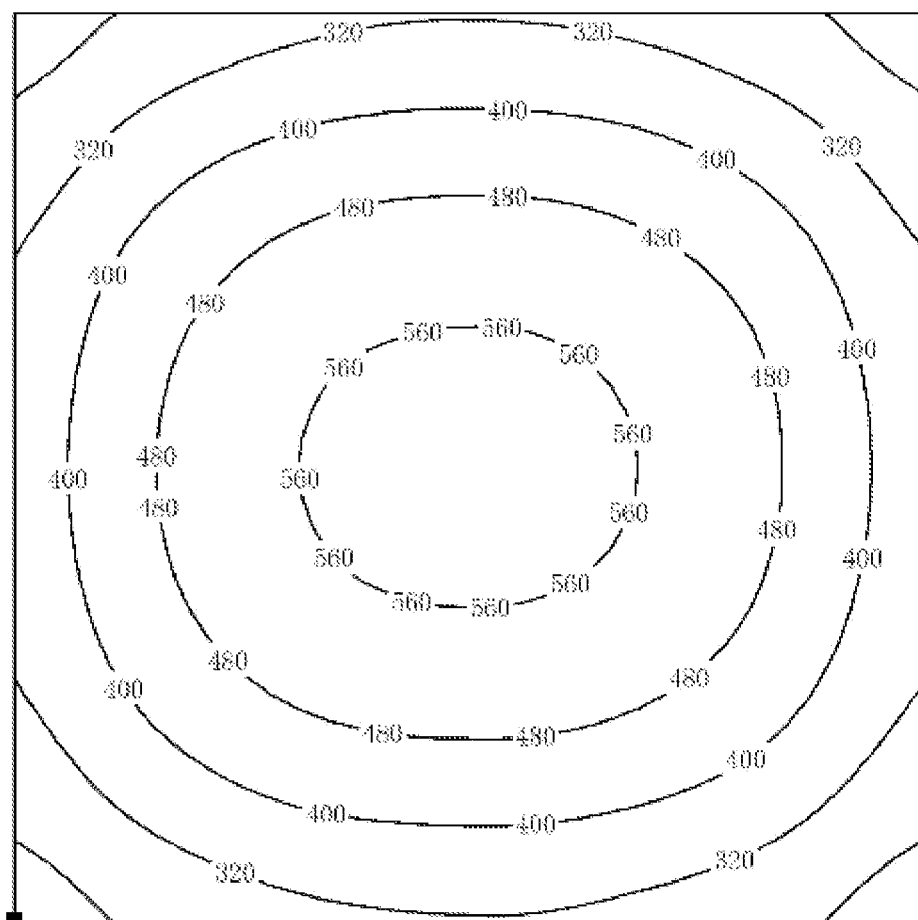
FIG. 18 is a schematic diagram of a spectrum of a non-reflection panel lamp with a height of 0.15 m and 1.2*1.2 m according to the embodiment.

In the comparison and statistics, three different heights of the reflection panel lamp from the top of the plant are selected, which are respectively 0.5 m, 0.3 m, and 0.15 m. The panel lamp of each height has two different sizes, that is, 1.4*1.4 m and 1.2*1.2 m. Through comparison of the multi-reflection panel lamp in this embodiment with the non-reflection panel lamp, detailed results are shown in the following table:

|  | Lamp reflector 90%, cultivation surface reflection of 70% | | | | Without reflection for lamps, and cultivation surface reflection of 70% | | | |
| --- | --- | --- | --- | --- | --- | --- | --- | --- |
|  | $E_{av}$ | $E_{min}$ | $E_{max}$ | $U_0$ | $E_{av}$ | $E_{min}$ | $E_{max}$ | $U_0$ |
|  | Distance of 0.5 m between the lamp and the top of the plant | | | | | | | |
| 1.4*1.4 m | Refer to FIG. 7 of the specification | | | | Refer to FIG. 8 of the specification | | | |
|  | 454 | 168 | 705 | 0.37 | 376 | 129 | 589 | 0.342 |
| 1.2 m*1.2 m | Refer to FIG. 9 of the specification | | | | Refer to FIG. 10 of the specification | | | |
|  | 515 | 260 | 704 | 0.505 | 428 | 203 | 590 | 0.475 |
|  | Distance of 0.3 m between the lamp and the top of the plant | | | | | | | |
| 1.4*1.4 m | Refer to FIG. 11 of the specification | | | | Refer to FIG. 12 of the specification | | | |
|  | 586 | 139 | 936 | 0.237 | 486 | 99 | 781 | 0.203 |
| 1.2 m*1.2 m | Refer to FIG. 13 of the specification | | | | Refer to FIG. 14 of the specification | | | |
|  | 689 | 281 | 937 | 0.408 | 574 | 212 | 784 | 0.369 |
|  | Distance of 0.15 m between the lamp and the top of the plant | | | | | | | |
| 1.4*1.4 m | Refer to FIG. 15 of the specification | | | | Refer to FIG. 16 of the specification | | | |
|  | 700 | 83 | 1289 | 0.119 | 580 | 44 | 1105 | 0.075 |
| 1.2 m*1.2 m | Refer to FIG. 17 of the specification | | | | Refer to FIG. 18 of the specification | | | |
|  | 867 | 251 | 1280 | 0.29 | 727 | 178 | 1095 | 0.245 |

The lighting effect of a luminaire with a reflector is significantly better than that of a luminaire without a reflector.

1. An average PPFD increases by about 20%.
2. The uniformity may increase by about 8% when the mounting height is 0.5 m, by about 15% when the mounting height is 0.3 m, and by about 19% when the mounting height is 0.15 m.
3. An increase in costs by 1% causes an increase in the utilization rate by about 20%, which means that energy can be saved by 20%.

When an area of a lamp panel exceeds 10% of a total reflection area, the lamp panel needs to be sprayed with high reflectivity. Alternatively, the reflector may be directly replaced with a high-reflectivity lamp panel.

It can be learned from the above statistical data that growth efficiency of plants increases with a decrease in the distance between the plant and the panel lamp, and the growth efficiency of the multi-reflection panel lamp is higher than that of the non-reflection panel lamp under the same circumstance, which not only can improve the growth efficiency, but also can increase the utilization rate of the plant to save energy.

It should be noted that the relational terms herein such as first and second are used only to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Unless otherwise specified, an element limited by "include . . . " does not exclude other elements existing in the process, method, object, or in addition, in this specification, "greater than", "less than", "exceeding", and the like are understood as not including the current number, and "over", "below", "within", and the like are understood as including the current number.

Although the foregoing embodiments have been described, those skilled in the art can make additional changes and modifications to these embodiments once they learn the basic creative concept. Therefore, the foregoing description is only the embodiments of the present invention, and does not limit the scope of patent protection of the present invention. An equivalent structure or an equivalent process transformation made by using the specification and the accompanying drawings of the present invention, or direct or indirect application to other related technical fields are included within the protection scope of the present invention.

What is claimed is:

1. A multi-reflection panel lamp, comprising: a fixing frame, a plurality of panel lamps, and a plurality of reflectors, wherein the plurality of panel lamps are embedded in the fixing frame parallel to each other, and the reflectors and the panel lamps are parallelly disposed on the fixing frame;

wherein limiting frames are provided at two ends of the panel lamps, the limiting frames are fixedly mounted to the fixing frame, and a plurality of mounting plates are disposed on the limiting frame at one of the two ends of the panel lamps and configured for fixing the panel lamps on the limiting frames;

wherein fixing plates are disposed on outer sides of the limiting frames, and limiting through holes are bored on upper surfaces of the fixing plates.

2. The multi-reflection panel lamp according to claim 1, wherein a number of the mounting plates is the same as a number of the panel lamps, and a plurality of holes are formed on outer sides of the mounting plates.

3. The multi-reflection panel lamp according to claim 1, wherein a number of the panel lamps is 2 or more, a number of the reflectors is 2 or more, and each of the reflectors is located between two adjacent panel lamps or adjacent to the panel lamps.

4. The multi-reflection panel lamp according to claim 1, wherein a light emitting diode (LED) driver is disposed on the fixing frame, and the LED driver is connected to the panel lamps and is parallel to the panel lamps.

5. The multi-reflection panel lamp according to claim 1, wherein rotational assemblies are disposed on the fixing frame, the rotational assemblies comprise rotational through holes and fixing buttons, the rotational through holes are disposed at two symmetrical ends of a lamp holder, and the fixing buttons are embedded in the rotational through holes.

6. The multi-reflection panel lamp according to claim 1, wherein the reflectors are rectangular.

7. A multi-reflection panel lamp, comprising: at least two multi-reflection panel lamps according to any of claims 5 and 6, wherein the at least two multi-reflection panel lamps are respectively disposed above and under a plant.

8. The multi-reflection panel lamp according to claim 7, wherein the multi-reflection panel lamp disposed above the plant is 0.5 m, 0.3 m, or 0.15 m from a top of the plant.

* * * * *